W. O. DUNTLEY & H. J. KIMMAN.
CONTROLLER FOR ELECTRIC DRILLS.
APPLICATION FILED JAN. 22, 1906.

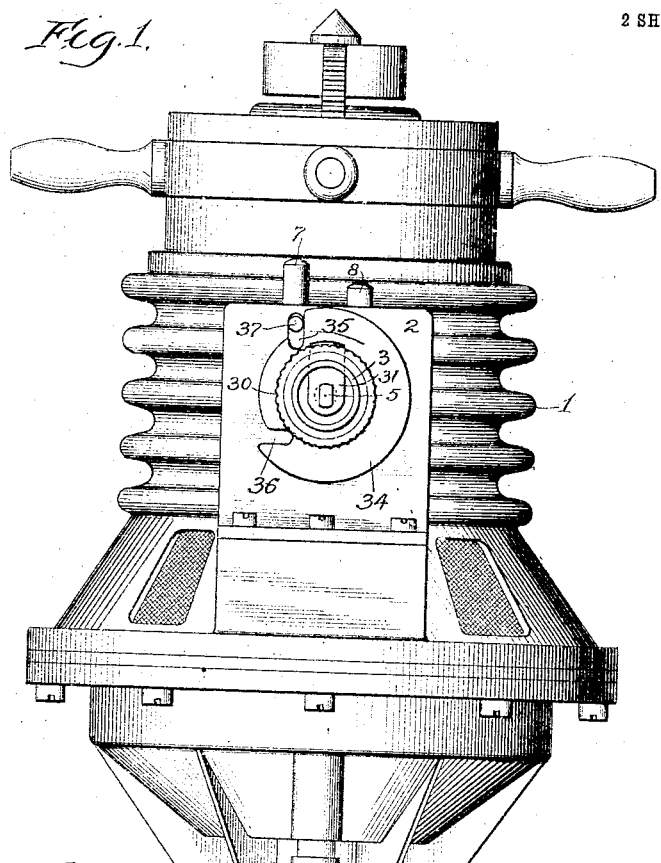

904,851.

Patented Nov. 24, 1908.

2 SHEETS—SHEET 2.

Witnesses
Edwin H. Smythe
Louis B. Erwin

Inventors
William O. Duntley & Henry J. Kimman
By Rector & Hibben
Their Attys

UNITED STATES PATENT OFFICE.

WILLIAM O. DUNTLEY, OF CHICAGO, ILLINOIS, AND HENRY J. KIMMAN, OF CLEVELAND, OHIO, ASSIGNORS TO CHICAGO PNEUMATIC TOOL COMPANY, OF CHICAGO, ILLINOIS, A CORPORATION OF NEW JERSEY.

CONTROLLER FOR ELECTRIC DRILLS.

No. 904,851.　　　Specification of Letters Patent.　　Patented Nov. 24, 1908.

Application filed January 22, 1906. Serial No. 297,378.

*To all whom it may concern:*

Be it known that we, WILLIAM O. DUNTLEY, residing at Chicago, Cook county, Illinois, and HENRY J. KIMMAN, residing at Cleveland, Cuyahoga county, Ohio, citizens of the United States, have invented certain new and useful Improvements in Controllers for Electric Drills, of which the following is a specification.

Our invention relates to electric drills in which the drill or other working tool is rotated by an electric motor or motors through the medium of proper operating connections, and relates more particularly to the switch for controlling the supply of current to the motor or motors.

The object of our invention is to provide a reversing switch in connection with the main or controlling switch and to cause such switches to so coöperate that the reversing switch is enabled to be operated only when the main or controlling switch is in its "off" position, with the result that the motor cannot be reversed while running in the opposite direction, and the possibility of burning out the motor and the destruction of the fuses caused by an excessive flow of current is overcome.

Figure 4:
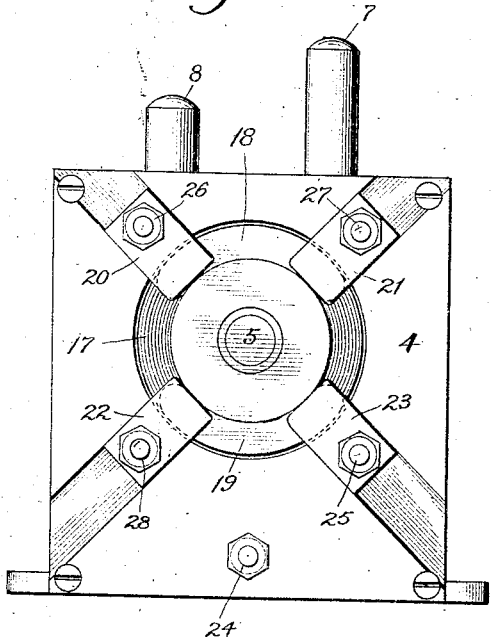
Figure 5:
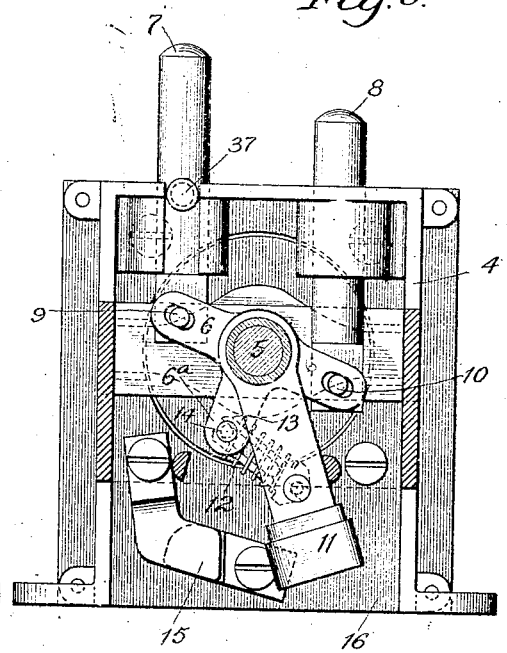
Figure 6:
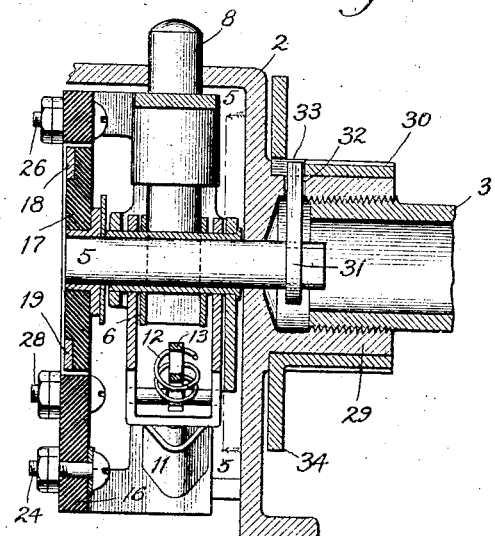
Figure 7:
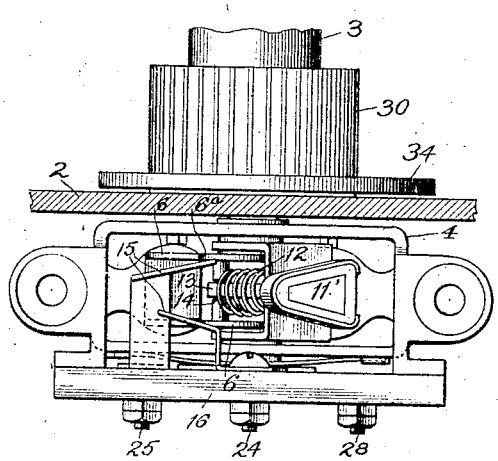

In the drawings, Figure 1 is a side elevation of an electric drill, in which our invention has been embodied; Fig. 2 a side elevation of a portion of the drill with a part thereof broken away to expose the interior of the switch box or casing; Fig. 3 a plan view of the same side of the drill as illustrated in Fig. 2 and illustrating the switch device thereof; Fig. 4 an elevation of the inner face of the switch device detached and illustrating the reversing switch; Fig. 5 a sectional elevation of the switch device removed and taken on the line 5—5 of Fig. 6; Fig. 6 a sectional elevation on the line 6—6 of Fig. 3; and Fig. 7 a bottom plan view of the switch device and associated parts.

Inasmuch as our invention relates only to the switch devices of an electric drill, such drill need be described and illustrated only in a general way and it will therefore suffice to say that the drill is provided with a main casing 1, to which the switch device, including the main or controlling switch and the reversing switch, is attached. In the present instance, as illustrated in Figs. 1, 2 and 3, the switch device is contained within a supplemental casing or box formed by plate 2 at one side of the casing and at the base of one of the grasping handles 3 of the drill.

Referring first to the switch which controls the supply leads to the motor, which switch, for convenience, will be hereinafter termed the main switch, as distinguished from the reversing switch, such main switch is arranged and mounted within a frame 4 provided with a transverse rock shaft 5, on which is mounted to oscillate a pair of rocker arms or levers 6, having two arms extending diametrically in opposite directions and a depending arm 6$^a$ at right angles to the other or similar arms. The two sets of opposite arms are operatively connected with the lower ends of the two switch buttons or plungers 7 and 8, such operative connection, in the present instance, being in the nature of a pin and slot connection, the pins 9 and 10 projecting from the lower ends of the switch buttons 7 and 8, respectively, and the slots being in the sets of the similar arms of the rocker arms or levers 6. Loosely hung upon the rock shaft 5 is the knife blade 11 having a yielding operating connection through the medium of the spring 12 and the fork 13 connected with the knife blade and coöperating with the transverse pin 14 arranged between the said arms 6$^a$. This knife blade 11 constitutes the movable member or contact which coöperates with the stationary contacts 15 which are mounted upon a plate 16 of fiber or other suitable insulating material.

When the parts are in the relative position illustrated in Fig. 5 with the switch button 7 elevated and the button 8 depressed, the switch is in "off" position, inasmuch as the knife blade 11 is out of contact with the stationary contacts 15. When, however, the button 7 is depressed and the rocker arms or levers 6 are thereby oscillated in an anti-clockwise direction (Fig. 5) the knife blade or movable contact is thrown suddenly into contacting position with respect to said stationary contacts after the pin 14 has substantially reached or passed the central longitudinal line of the knife blade and the arms by which it is suspended. The contacts remain in this "on" position until the button 8, which has been elevated by the depression of the button 7, is itself depressed, to bring about the relative position of the parts illustrated in Fig. 5, whereupon the switch is thrown suddenly into its "off" position and the circuit which supplies the current to the motor is broken.

The reversing switch comprises a disk 17 mounted upon the inner end of the rock shaft 5 and arranged to rock with said shaft. This disk projects through a circular opening cut in the fiber plate or block 16 and is provided with contacts which are in the form of segments 18 and 19 arranged on opposite sides of the center of the disk. These segments constitute the movable members or contacts, the stationary contacts or terminals consisting of a series of four contact strips 20, 21, 22 and 23, arranged 90 degrees apart and having such relation with the movable contacts 18 and 19 that two of the stationary contacts coöperate with the same movable contact or segment when the reversing switch is in one position or the other.

One of the stationary contacts 15 is electrically connected with a binding post 24, while the other stationary contact is electrically connected with a binding post 25, which is itself electrically connected with the contact 23 hereinbefore described. The contacts 20, 21 and 22 are provided with similar binding posts 26, 27 and 28, respectively, similar to the binding post 25. The two binding posts 27 and 28 are connected to the leading in wires, while the two binding posts 25 and 26 are connected with the switch elements, it being understood that in use the binding post 24 is electrically connected with the binding post 26. The proper running of the circuits in which the motor is included is so obvious to those skilled in the art that no further explanation is required.

It will be understood that the switch device is arranged adjacent the inner end or post of one of the grasping handles of the drill, as clearly indicated in the drawings, particularly in Fig. 6, wherein the plate or supplemental casing 2 which projects laterally from the main casing of the drill is provided with a lateral cylindrical boss 29 within which the particular grasping handle 3 just referred to is secured, as by screw-threading thereto. For operating the reversing switch we provide novel and efficient mechanism which, in the present instance, consists of a knurled or corrugated sleeve 30, whose inner diameter substantially equals the outer diameter of the boss 29 and is arranged to be oscillated thereon, such sleeve being also, in the present instance, concentric with said grasping handle 3. As more clearly indicated in Fig. 6, the rock shaft 5 is provided at its outer end with an arm 31 which projects upwardly through an arc-shaped slot 32 in the boss 29 and into a slot 33 in the sleeve 30. It will be evident that upon oscillating the sleeve in one direction or the other the shaft 5 is rocked so as to cause a reversal of the direction of rotation of the motor by changing the relative position of the segments 18 and 19 with respect to their stationary contacts.

For the purpose of locking the reversing switch in one or the other of its two positions, we provide novel and efficient mechanism and which consists, in the present instance, of a notched flange 34 forming a part of the sleeve 30 and arranged to coöperate with a movable member or element of the main switch. As shown more clearly in Fig. 1, the flange 34 is provided with two notches 35 and 36 which are substantially transverse to the direction of rotation of the sleeve 30. The movable element of the main switch which coöperates with these notches and which constitutes the locking mechanism in connection therewith, consists of a pin 37 extending laterally from the button 7 of the main switch, as clearly indicated in Figs. 1, 2, 3 and 5. The construction and arrangement is such that when the button 7 is in its elevated position, that is when the main switch is at "off" position, the pin 37 is clear of the notches, as clearly indicated in Fig. 1. Consequently at this time the sleeve 30 may be oscillated for operating the reversing switch. When, however, the button 7 is depressed and the main switch thereupon put at "on" position, the pin 37 is likewise depressed, by which movement such pin is projected into one of the other slots 35 or 36 which happens to be presented thereto. In case the reversing switch is in the position indicated in Fig. 1, the pin 37 will be projected into the notch 35. In whichever notch the pin 37 may be projected, the reversing switch is locked against operation and this condition continues so long as the main switch is at "on" position. When, however, the main switch is operated to "off" position, thereby carrying the pin 37 to an inoperative position, the locking mechanism is rendered inoperative, whereupon the reversing switch is free to be operated. By these means and in this manner, the motor is protected against improper manipulation by an unskilled or careless workman, inasmuch as it is practically impossible to burn out the motor or destroy the fuses in the operation of reversing the motor, which might easily occur in case the reversing switch was operated while the main switch was still at "on" position. The described association and coöperation of the two types of switches through the medium of the locking mechanism, absolutely prevents the operation of the reversing switch whenever the main switch is at "on" position, with the result that the operator is compelled to first turn off the main switch and break the supply of current to the motor before he is enabled to operate the reversing switch. Moreover, the flange 34 serves another function besides that of acting as part of the locking mechanism, inasmuch as the outer portion of the longer sides or walls of the notches constitute, in connection with the pin 37, stops for limiting the degree of oscillation of the sleeve and consequently of the reversing switch in one direction or the other.

We claim:

1. In combination with an electric drill, and its grasping handles, a main switch arranged adjacent one of such handles, a reversing switch, and means for locking the reversing switch when the main switch is at "on" position.

2. In combination with an electric drill and its grasping handles, a main switch arranged adjacent the inner end of one of the handles, a reversing switch, and means for locking the reversing switch when the main switch is at "on" position.

3. In combination with an electric drill and its grasping handles, a main switch arranged adjacent the inner end of one of the handles and having operating buttons on either side of the longitudinal axis of said handle, a reversing switch, and means for locking the reversing switch when the main switch is at "on" position.

4. In combination with an electric drill, and its grasping handles, a main switch arranged adjacent one of such handles, a reversing switch, and a sleeve concentric with said handle for operating the reversing switch.

5. In combination with an electric drill, and its grasping handles, a main switch arranged adjacent one of such handles, a reversing switch, buttons adjacent the base of said handle for operating the main switch, and a sleeve for operating the reversing switch.

6. In combination with an electric drill and its grasping handles, a main switch, a reversing switch, a sleeve concentric with one of the handles for operating the reversing switch, and means controlled by the operation of the main switch for locking the reversing switch when the former is "on."

7. The combination with an electric drill and its grasping handles, a main switch, a reversing switch, a sleeve concentric with one of the handles for operating the reversing switch, and means controlled by the operation of the main switch for locking the reversing switch when the former is "on," comprising a notched flange on the sleeve and a movable element coöperating therewith and actuated by the main switch.

8. In combination with an electric drill and its grasping handles, a main switch, a reversing switch, a sleeve concentric with one of the handles for operating the reversing switch, and means controlled by the operation of the main switch for locking the reversing switch when the former is "on," comprising a flange having a pair of notches corresponding with the two positions of the reversing switch, and a movable projection actuated by the main switch and positioned in one or the other of said notches when the main switch is "on" but positioned outside thereof when the main switch is "off."

9. In combination with an electric drill and its grasping handles, a main switch, a reversing switch, a sleeve concentric with one of the handles for operating the reversing switch, and means controlled by the operation of the main switch for locking the reversing switch when the former is "on," comprising a flange having a pair of notches corresponding with the two positions of the reversing switch, said main switch having operating buttons, and a pin extending from one of the buttons and arranged to be clear of the notches when the main switch is "off" but to be projected into one of them to lock the reversing switch when the main switch is "on."

10. In combination with an electric drill and its grasping handles, a main switch, a reversing switch, a sleeve concentric with one of the handles for operating the reversing switch, and means controlled by the operation of the main switch for locking the reversing switch when the former is "on," comprising a flange having a pair of notches substantially transverse to the direction of rotation of said sleeve and corresponding with the two portions of the reversing switch, said main switch having operating buttons, and a pin extending from one of the buttons and arranged to be projected into the presented notch whenever the main switch is "on."

11. In combination with an electric drill, and its grasping handles, a main switch arranged adjacent one of such handles, a reversing switch, and a sleeve concentric with one of the grasping handles for operating the reversing switch.

12. In combination with the casing of an electric drill and its grasping handles, a switch box located at one side of said casing and having a boss with which one of the grasping handles is connected, a main switch and a reversing switch within said box, and a sleeve mounted for oscillation on said boss and operatively connected with the reversing switch.

13. In combination with the casing of an electric drill and its grasping handles, a switch box located at one side of said casing and having a boss with which one of the grasping handles is connected, a main switch and a reversing switch within said box, buttons arranged adjacent the base of said grasping handle, and a sleeve mounted for oscillation on said boss and operatively connected with the reversing switch.

14. In combination with the casing of an electric drill and its grasping handles, a switch box located at one side of said casing and having a boss with which one of the grasping handles is connected, a main switch and a reversing switch within said box, an operating arm connected with the reversing switch and extending through said boss, and a sleeve mounted for oscillation on the boss and arranged to engage said operating arm.

15. In combination with the casing of an electric drill and its grasping handles, a switch box located at one side of said casing and having a boss with which one of the grasping handles is connected, a main switch and a reversing switch within said box, an operating arm connected with the reversing switch and extending through said boss, and a sleeve mounted for oscillation on the boss and having an opening engaging the outer end of said operating arm.

16. In combination with the casing of an electric drill and its grasping handles, a switch box which is located at one side of said casing and to which one of the grasping handles is connected, and a combined main and reversing switch arranged within said box and in easy reach of the operator's hand grasping said particular handle.

17. In combination with an electric drill, and its grasping handles, a main switch arranged adjacent one of such handles, a reversing switch, means for locking the reversing switch when the main switch is at "on" position, an oscillating member for operating the reversing switch, and means for limiting the degree of oscillation of such member.

18. In combination with an electric drill, and its grasping handles, a main switch arranged adjacent one of such handles, a reversing switch, and a combined lock and stop for locking the reversing switch when the main switch is at "on" position.

19. In combination with an electric drill, and its grasping handles, a main switch arranged adjacent one of such handles, and a combined lock and stop for locking the reversing switch when the main switch is at "on" position, comprising a sleeve operatively connected with the reversing switch and provided with a flange having a reduced portion with end notches, and a pin actuated by its main switch and coöperating with the reduced portion and notches of said flange.

20. In combination with an electric drill, and its grasping handles, a main switch arranged adjacent one of such handles, a reversing switch, and a combined lock and stop for locking the reversing switch when the main switch is at "on" position, said main switch having operating buttons, and a pin arranged on one of the buttons and coöperating with the reduced portion and notches of said flange.

21. In combination with an electric drill having diametrically positioned grasping handles, a main switch, a rotatable reversing switch, said switches being arranged adjacent the inner end of one of the grasping handles, means for locking the reversing switch against movement when the main switch is at "on" position.

22. In combination with an electric drill having diametrically positioned grasping handles, a main switch, a reversing switch, said switches being arranged adjacent the inner end of one of the grasping handles, and a hand operated locking device for preventing operation of the reversing switch when the main switch is at "on" position.

23. In combination with an electric drill having a main casing, a supplemental casing secured to one side of the main casing, a main switch and a reversing switch arranged within the supplemental casing, a grasping handle supported at its inner end in said supplemental casing, and means for locking the reversing switch against movement when the main switch is at "on" position.

24. In combination with an electric drill having a main casing, a supplemental casing secured to one side of the main casing, a main switch and a reversing switch arranged within the supplemental casing, a grasping handle supported at its inner end in said supplemental casing, and a hand-operated locking device located at the inner end of the handle for locking the reversing switch against movement when the main switch is at "on" position.

25. In combination with an electric drill having a main casing, a supplemental casing secured to one side of the main casing, a main switch and a reversing switch arranged within the supplemental casing, a grasping handle supported at its inner end in said supplemental casing, means for operating the main switch, and a sleeve mounted for oscillation on the supplemental casing and operatively connected with the reversing switch.

WILLIAM O. DUNTLEY.
HENRY J. KIMMAN.

Witnesses to signature of William O. Duntley:
 S. E. HIBBEN,
 LOUIS B. ERWIN.

Witnesses to signature of Henry J. Kimman:
 F. D. JOHNSON,
 C. E. WALKER.